US012798796B2

(12) United States Patent

Klug

(10) Patent No.: US 12,798,796 B2

(45) Date of Patent: Nov. 17, 2026

(54) SYSTEM AND METHOD FOR IDENTIFYING AND DISTINGUISHING SPACECRAFT APPENDAGES FROM THE SPACECRAFT BODY

(71) Applicant: Falcon Exodynamics, Inc., El Segundo, CA (US)

(72) Inventor: Michael Klug, Redondo Beach, CA (US)

(73) Assignee: Falcon Exodynamics, Inc., El Segundo, CA (US)

( * ) Notice: Subject to any disclaimer, the term of this patent is extended or adjusted under 35 U.S.C. 154(b) by 0 days.

(21) Appl. No.: 19/196,481

(22) Filed: May 1, 2025

(65) Prior Publication Data

US 2026/0217390 A1 Jul. 30, 2026

Related U.S. Application Data

(63) Continuation-in-part of application No. 18/443,688, filed on Feb. 16, 2024, now Pat. No. 12,330,818, (Continued)

(51) Int. Cl.

| | |
|---|---|
| ***G01C 21/24*** | (2006.01) |
| ***B64G 1/64*** | (2006.01) |
| ***B64G 3/00*** | (2006.01) |
| ***G06T 3/40*** | (2006.01) |
| ***G06T 7/33*** | (2017.01) |
| ***G06T 7/66*** | (2017.01) |
| ***G06V 10/50*** | (2022.01) |

(Continued)

(52) U.S. Cl.

CPC ................ *B64G 1/646* (2013.01); *G06T 3/40* (2013.01); *G06T 7/337* (2017.01); *G06T 7/66* (2017.01); *G06V 10/50* (2022.01); *G06V 10/54* (2022.01); *G06V 10/803* (2022.01); *G06V 20/52* (2022.01); *G06T 2207/10036* (2013.01); *G06T 2207/10048* (2013.01); *G06T 2207/20016* (2013.01); *G06T 2207/20084* (2013.01); *G06V 10/82* (2022.01)

(58) Field of Classification Search

None

See application file for complete search history.

(56) References Cited

U.S. PATENT DOCUMENTS 8,144,931 B1 * 3/2012 Hartman ................ G06V 10/89 348/169

2019/0248487 A1 * 8/2019 Holtz .................. G06V 10/764

(Continued)

*Primary Examiner* — Idowu O Osifade

(57) ABSTRACT

A method for controlling docking with a spacecraft includes receiving at least one first image pixel stream from at least one camera; receiving a second pixel stream of images at multiple wavelengths from a spectral camera, texture processing the at least one image pixel stream to generate at least one texture map for the at least one image pixel stream, spectral image processing the second pixel stream to generate at least one spectral map, generating thresholding results for each of the at least one pixel image stream responsive to the generated at least one texture map and the at least one spectral map, fusing each of the thresholding results for the at least one pixel image stream to create fused thresholding results, determining a bus centroid of the spacecraft responsive to the generated fused thresholding results, and controlling docking of with the spacecraft responsive to the determined bus centroid.

20 Claims, 8 Drawing Sheets

Related U.S. Application Data which is a continuation-in-part of application No. 18/450,602, filed on Aug. 16, 2023, now Pat. No. 11,945,609.

(51) Int. Cl.

| | |
|---|---|
| ***G06V 10/54*** | (2022.01) |
| ***G06V 10/80*** | (2022.01) |
| ***G06V 20/52*** | (2022.01) |
| ***G06V 20/56*** | (2022.01) |
| *G06V 10/82* | (2022.01) |

(56) References Cited

U.S. PATENT DOCUMENTS

| | | | | |
|---|---|---|---|---|
| 2020/0354077 | A1* | 11/2020 | Yang | B64D 45/08 |
| 2021/0080585 | A1* | 3/2021 | Gilliland | G01S 17/88 |
| 2021/0383551 | A1* | 12/2021 | Fiala | G06T 7/13 |
| 2021/0394923 | A1* | 12/2021 | Yang | B64C 39/024 |
| 2022/0026929 | A1* | 1/2022 | Foster | G05D 1/1064 |

* cited by examiner

SYSTEM AND METHOD FOR IDENTIFYING AND DISTINGUISHING SPACECRAFT APPENDAGES FROM THE SPACECRAFT BODY

RELATED APPLICATIONS

This application is a continuation-in-part of copending U.S. patent application Ser. No. 18/443,688, filed Feb. 16, 2024, entitled SYSTEM AND METHOD FOR IDENTIFYING AND DISTINGUISHING SPACECRAFT APPENDAGES FROM THE SPACECRAFT BODY which is a continuation-in-part of copending U.S. patent application Ser. No. 18/450,602 filed Aug. 16, 2023, entitled SYSTEM AND METHOD FOR IDENTIFYING AND DISTINGUISHING SPACECRAFT APPENDAGES FROM THE SPACECRAFT BODY which is incorporated herein by reference in its entirety.

TECHNICAL FIELD

The present invention relates to image processing, and more particularly for using image processing to differentiate between appendages on a spacecraft and its primary body.

BACKGROUND

One of the most difficult processes required in spaceflight involves docking maneuvers from one spacecraft to another. This process requires highly accurate control in order to align a docking spacecraft with an associated docking port of a second spacecraft. Additional hazards associated with the docking of a spacecraft involve various appendages such as solar arrays, antennas, etc. that may be extending from the primary spacecraft body. The docking procedure involves avoiding these appendages in order to avoid a catastrophic collision.

There exist a number of current solutions to avoid issues with appendages of spacecraft. These include the use of fiducials, subject spacecraft model libraries and neural networks or similarly trained algorithms. Fiducials involve the use of a known beacon or physical marking in order to guide in a docking spacecraft to a predetermined docking point. Fiducials are used to identify an a-priori pattern on the subject spacecraft being docked with by the docking spacecraft. A subject spacecraft model library accounts for the different subject spacecraft profiles under various lighting conditions. A lookup algorithm is utilized in operations to compare a captured visible spectrum image against a catalog of profiles to determine the most likely profile/pose of the subject spacecraft. A neural network or similarly trained algorithm which has been trained against a set of images of the subject spacecraft in various poses and lighting conditions enables a determination of the pose of the subject spacecraft during docking operations and a determination of the spacecraft body from various poses of the spacecraft. All of these algorithms require a-priori knowledge of the subject spacecraft structure. Thus, some system for enabling discernment of appendages for an unknown spacecraft would provide for improved docking operations and even for autonomous docking with an unfamiliar craft.

SUMMARY

The present invention, as disclosed and described herein, in one aspect thereof comprises a method for controlling docking with a spacecraft includes receiving at least one first image pixel stream from at least one camera; receiving a second pixel stream of images at multiple wavelengths from a spectral camera, texture processing the at least one image pixel stream to generate at least one texture map for the at least one image pixel stream, spectral image processing the second pixel stream to generate at least one spectral map, generating thresholding results for each of the at least one pixel image stream responsive to the generated at least one texture map and the at least one spectral map, fusing each of the thresholding results for the at least one pixel image stream to create fused thresholding results, determining a bus centroid of the spacecraft responsive to the generated fused thresholding results, and controlling docking of with the spacecraft responsive to the determined bus centroid.

BRIEF DESCRIPTION OF THE DRAWINGS

For a more complete understanding, reference is now made to the following description taken in conjunction with the accompanying Drawings in which.

DETAILED DESCRIPTION

Figure 1:
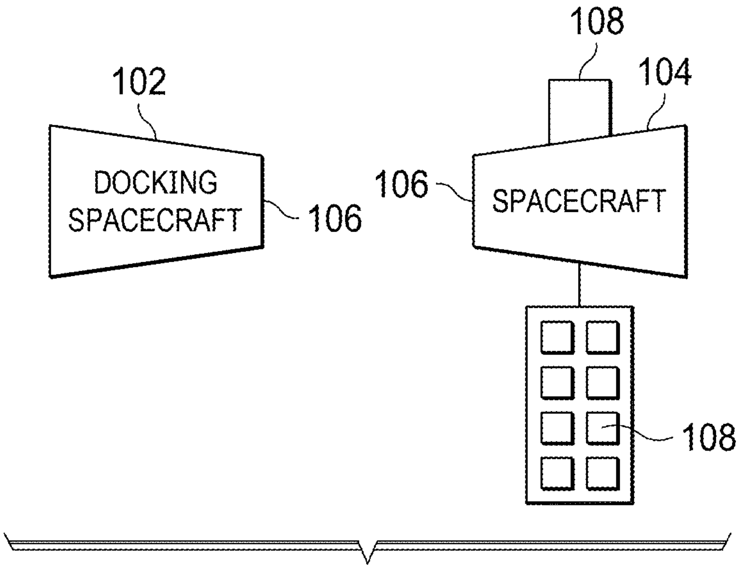
FIG. 1 illustrates a docking spacecraft and a spacecraft including multiple appendages.

Referring now to the drawings, wherein like reference numbers are used herein to designate like elements throughout, the various views and embodiments of a system and method for identifying and distinguishing spacecraft appendages from the spacecraft body are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to the drawings, and more particularly to FIG. 1, there is illustrated the operating environment of the current invention. FIG. 1 illustrates a docking spacecraft 102 and a second spacecraft 104 with which the docking spacecraft will perform docking maneuvers. For purposes of discussion a spacecraft may comprise any maneuvering or orbiting craft such as, but not limited to, a manned spacecraft, an unmanned probe, a satellite, etc. While performing a docking operation, the docking spacecraft 102 must maneuver with respect to the second spacecraft 104 to align docking ports or connections 106 of each spacecraft. While the docking spacecraft 102 is performing a docking operation, the docking spacecraft must avoid various appendages 108 that extend from the second spacecraft 104. When performing a docking operation, a collision with any appendage 108 extending from the second spacecraft 104 can cause serious and even catastrophic damage to one or both of the spacecraft. Current docking techniques involve the use of non-autonomous docking operations involving the use of a skilled pilot. Autonomous docking operations require the use of fiducials, a spacecraft model library or neural networks or similarly trained algorithms that require a large amount of previous knowledge that would not be available for an unknown second spacecraft 104 that was being docked with by the docking spacecraft 102.

Figure 2:
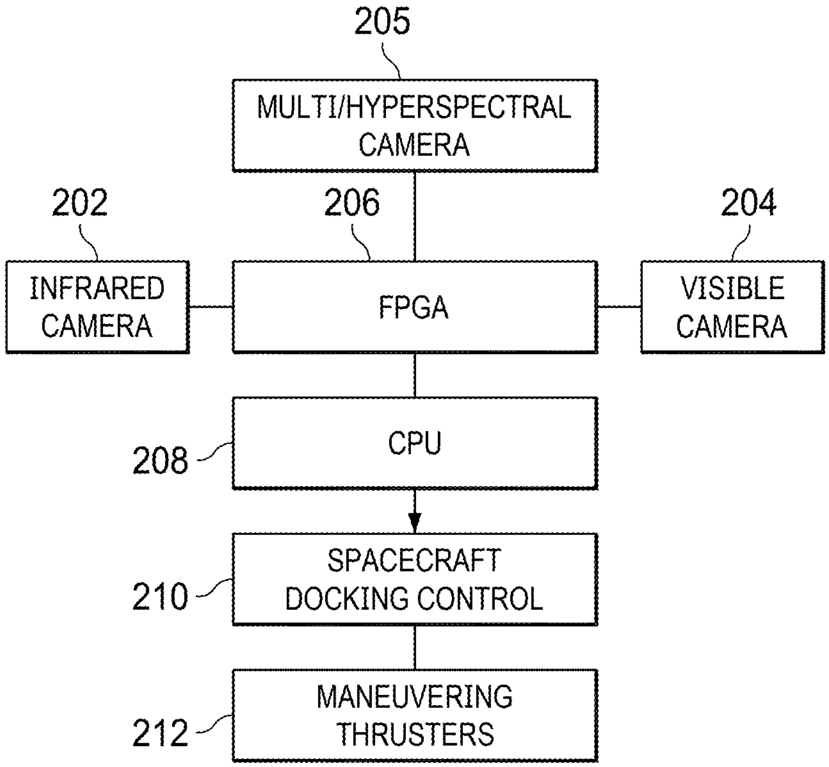
FIG. 2 illustrates a block diagram of the appendage identification and control system for a spacecraft.

Referring now to FIG. 2, there is illustrated a block diagram of the system for distinguishing appendages on a second spacecraft 104 to enable the docking spacecraft 102 to docked therewith. The docking sensors consist of an infrared camera 202, a visible camera 204, and a multi/hyperspectral camera 205. Infrared camera 202 outputs infrared images in a pixel stream, the visible camera 204 provides normal visible image data in a pixel stream, and the multi/hyperspectral camera 205 provides images at multiple wavelengths in a pixel stream. The use of the visible camera 204 and multi/hyperspectral camera 20X are optional and processing according to the below describe system may be achieved using only the infrared camera 202. The combination of the infrared data from the infrared camera 102, the visible data from the visible camera 204, and multi/hyperspectral data from the multi/hyperspectral camera 205 improves discrimination performance of the system. Image data from each of the infrared camera 202, visible camera 204, and multi/hyperspectral camera 205 are provided to a field programmable gate array (FPGA) 206. The FPGA 206 processes the image pixel stream from each of the infrared camera 202 and visible camera 204 to generate texture processed data as texture maps and material signature data from the multi/hyperspectral camera 205 that are provided to a general-purpose processor 208. The processor 208 performs processing of the textured map and material signature data as will be more fully described hereinbelow from each of the infrared camera 202, visible camera 204, and multi-hyperspectral camera 205 in order to determine a spacecraft bus centroid. The spacecraft bus centroid is provided to the docking control system 210 of the docking spacecraft in order to enable the generation of autonomous control signals for the docking spacecraft. The spacecraft docking control system 210 of the docking spacecraft generates various control signals to the maneuvering thrusters 212 of the docking spacecraft 102 to pilot the spacecraft to a successful docking operation with the second spacecraft 104 in a manner that avoids the various appendages 108 that extend from the second spacecraft 104.

Figure 3:
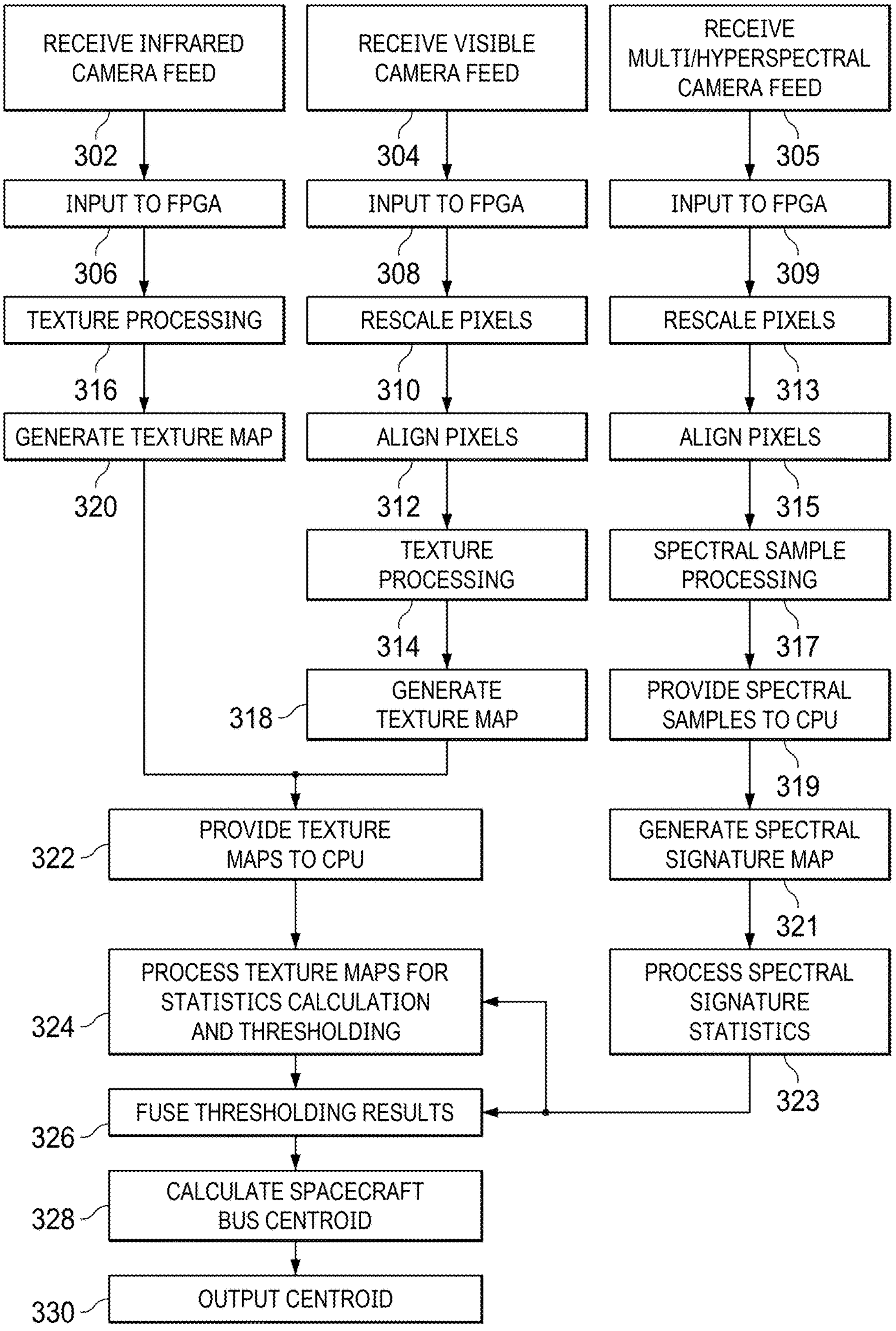
FIG. 3 illustrates a flow diagram for the determination of the centroid of an object.

Referring now to FIG. 3, there is illustrated a flow diagram of the process for generating the spacecraft bus centroid responsive to image data provided from the infrared camera 202, visible camera 204, and multi/hyperspectral camera 205. Initially, pixel image data is received from the infrared camera feed, visible camera feed, and multi/hyperspectral camera feed at 302, 304, and 305, respectively. The received image feeds are input at 306 and 308 from the infrared camera 202 to the FPGA 206 (306), from the visible camera 204 to the FPGA 206 (308), and from the multi/hyperspectral camera 205 to the FPGA 206 (309). The infrared and visible images are fed into the FPGA 206 using a pixel transfer standard (e.g., CameraLink, Ethernet, etc.). As the pixels enter the FPGA 206, they enter three different pipelines for each type of camera 202, 204 and 205.

The received pixel image data from the visible camera 204 is rescaled at step 310. The rescaling process is a method to resize the visible image data and may involve scaling the visible image data either up or down. The resizing algorithm will process the received visible image data and generate a new image having a different resolution. The rescaled pixel data from step 310 is aligned with the pixels from the infrared image data at step 312. The need for pixel rescaling and alignment arises from the fact that the visible camera image data will have many more pixels than the infrared camera image data for a similar area being monitored. The rescaled pixels are aligned at step 312. The rescaling 310 and alignment 312 processes use linear interpolation in a fast pipelined process within the FPGA 206 to generate a resampled image within the time between pixels being sent from the camera 104. This enables the use of cameras with little or no vertical or horizontal blanking.

The received pixel image data from the multi/hyperspectral camera 205 is rescaled at step 313. The rescaling process is a method to resize the multi/hyperspectral image data and may involve scaling the multi/hyperspectral image data either up or down. The resizing algorithm will process the received multi/hyperspectral image data and generate a new image having a different resolution. The rescaled pixel data from step 313 is aligned with the pixels from the infrared and visible image data at step 315. The need for pixel rescaling and alignment arises from the fact that the multi/hyperspectral camera image data will have more or fewer pixels than the infrared camera image data for a similar area being monitored. The rescaled pixels are aligned at step 315. The rescaling 313 and alignment 315 processes use linear interpolation in a fast pipelined process within the FPGA 206 to generate a resampled image within the time between pixels being sent from the camera 104. This enables the use of cameras with little or no vertical or horizontal blanking.

The aligned pixels from the visible image data and the infrared pixels from the infrared image data are texture processed at steps 314 and 316, respectively, to generate texture maps. The data from the infrared camera 202 and the visible camera 204 are provided to separate texture processing pipelines within the FPGA 206. The texture processing pipelines perform identical but separate operations to each set of image data. The texture processing pipelines are identical between both the infrared and visible data paths. The texture processing operation will be more fully discussed hereinbelow with respect to FIG. 4. The texture processing pipelines process the texture statistics in a pipeline as the image pixels (infrared/visible) stream into the FPGA 206. The texture image is complete and available for use by the CPU 208 as soon as the last pixel of an image has finished being sent to the FPGA 206. The texture processing data generated at steps 314 and 316 is used to generate texture maps for the visible data at step 318 and to generate a texture map for the infrared data at step 320. Thus, the FPGA 206 will have created two separate texture maps one for the infrared data and one for the visible data. An image texture comprises a set of metrics calculated in image processing designed to quantify the perceived texture of an image. Image texture gives information about the spatial arrangement of color or intensities in an image or selected region of an image.

The aligned pixels from the multi/hyperspectral image data are spectrally processed at step 317 to generate spectral signature data. The spectral processing operation will be more fully discussed hereinbelow with respect to FIG. 10. The spectral processing pipeline processes the spectral statistics in a pipeline as the image pixels stream into the FPGA 206 from the multi/spectral camera 205. The multi/hyperspectral image is complete and available for use by the CPU 208 as soon as the last pixel of a multi/hyperspectral image has finished being sent to the FPGA 206.

The texture map generated from the visible image data at step 318 as well as the texture map generated using the infrared image data at step 320 are both provided to a central processing unit at step 322. The visible data texture map and infrared data texture map are processed by the CPU 208 to perform statistics calculations and thresholding for each set of texture maps. The algorithm for the statistics calculations and thresholding uses tuned and configurable weightings along with calculated standard deviations, minimums and maximums of the texture maps in order to produce a threshold utilized by later processing to produce a binary map for each sensor channel of the infrared and visible image data.

The spectral sample data generated from the multi/hyperspectral data at step 317 is provided to the central processing unit 208 at step 319. The spectral sample data is processed by the CPU 208 to generate at step 321 a spectral signature map and processed at step 323 to generate spectral signature statistics. The algorithm for the statistics calculations and thresholding uses tuned and configurable weightings along with calculated standard deviations, minimums and maximums of the spectral intensity data in order to produce likely candidate material and confidence information utilized by later processing at steps 324 and 326.

The thresholding information for both the visible data and infrared data are fused at step 326. The thresholding and fusing process can use the material and confidence information from the spectral signature map to further assist thresholding of the visible and infrared data. The fusing process is made easier by the rescaling and alignment performed earlier within the process at 310, 312, 313, and 315. Fusing of the thresholding information is accomplished by combining the binary masks resulting from each sensor channel (infrared/binary) with binary operations (AND, NOT, OR) which are unique to the phenomenology of each sensor channel to produce a robust output. The exact operations are configurable as the best performance results from tuning these combination with the threshold weights used in the previous step.

The fused thresholding results from step 326 are used by the processor 208 to calculate the bus centroid of the spacecraft at step 328. The generated centroid is output at step 330 and used by control systems to assist the docking spacecraft 102 to dock with a second spacecraft 104 while determining and avoiding various appendages 108.

Since the FPGA 206 completes the initial processing of the data in the real time, the CPU 208 has up to an additional frame time to complete processing and output the spacecraft bus centroid. The entire process leads to a centroid being processed at the same frame rate as the cameras and delayed only up to one frame of the camera. The processing provided by the CPU 208 can be tuned in order to improve system performance under a variety of conditions.

Figure 4:
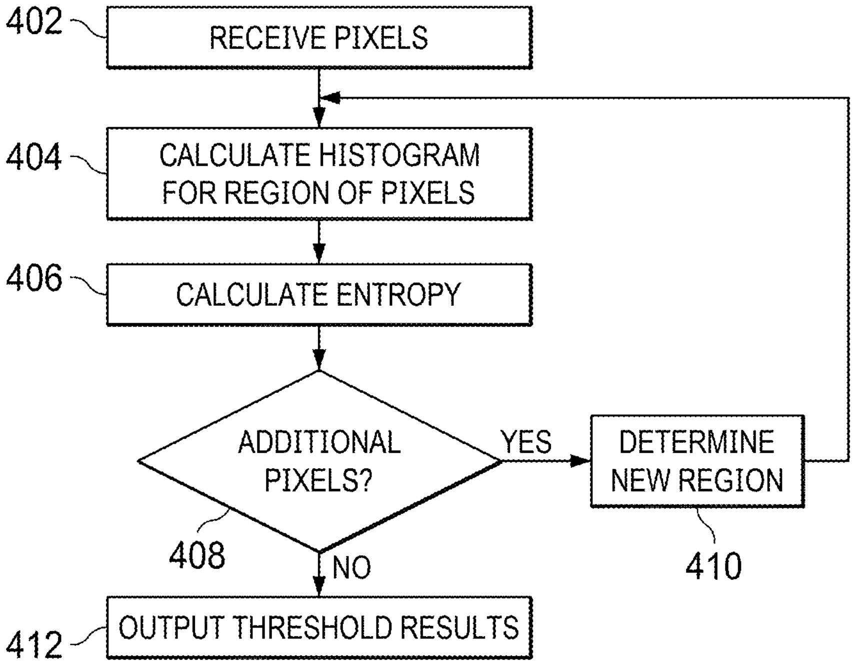
FIG. 4 illustrates a flow diagram of the process for texture processing.

Referring now to FIG. 4 there are more particulars illustrating the process for texture processing the infrared data and the visible data. The infrared data and visible data are texture processed separately and combined later when fusing the thresholding results. The texture processing of each of the infrared images and the visible images involves first receiving the associated pixel images at step 402. Next, a histogram of a first region of the pixels is calculated at step 404 according to the equation:

$$\text{Histogram}_{pixel}[val] = \sum_{i=\text{first pixel of region}}^{\text{last pixel of region}} (i == val)$$

The generated histogram is used to calculate entropy at step 406 wherein the number of pixels in the analyzed region is used according to the equation:

$$\text{Output[pixel]} = \sum_{i=1}^{n} \frac{\text{Histogram}[i]_{pixel}}{n} * (\log_2 \text{Histogram}[i] - \log_2 n)$$

Inquiry step 408 determines if additional pixels are available and if so, control passes to step 410 to determine a next pixel region. If no further additional pixels are available, the texture processed image map is output at step 412.

The specific FPGA 206 implementation optimizes the computation by using comparators in the FPGA for formation of the histogram. Additionally, for a fixed region, the logarithmic calculations are simplified to lookup tables due to the fact that the pixel values are a set of known discrete integers (0, 1, 2, 3 . . . ). Finally, some of the intermediate calculations are done using fixed point integer math. The pipeline is formed by recognizing that the output of the region is an incremental update formed by adding and removing only pixels that slide into or out of the region at step 408.

Figure 5:
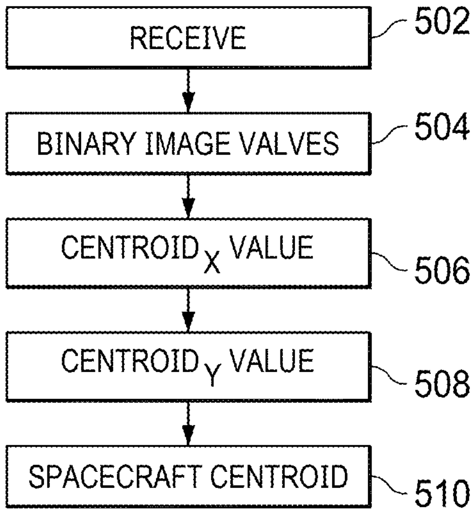
FIG. 5 illustrates a flow chart illustrating the process for determining the centroid of the spacecraft.

FIG. 5 is a flow chart illustrating the process for determining the centroid of the spacecraft. The centroid is determined using the below equations:

$$\text{centroid}_x = \frac{\sum_{i=1}^{n} (binaryImage_x[i] * binaryImage[i])}{\sum_{i=1}^{n} binaryImage[i]}$$

$$\text{centroid}_y = \frac{\sum_{i=1}^{n} (binaryImage_y[i] * binaryImage[i])}{\sum_{i=1}^{n} binaryImage[i]}$$

where the binaryImage is a matrix made of either "0" or "1" indicating if the texture map exceeded the threshold. $\text{BinaryImage}_x$ is a matrix of the same size as binaryImage but containing the x coordinate of each pixel. $\text{BinaryImage}_y$ is a matrix of the same size as binaryImage but containing the y coordinate of each pixel and $\text{binaryImage}_y$.

Figure 10:
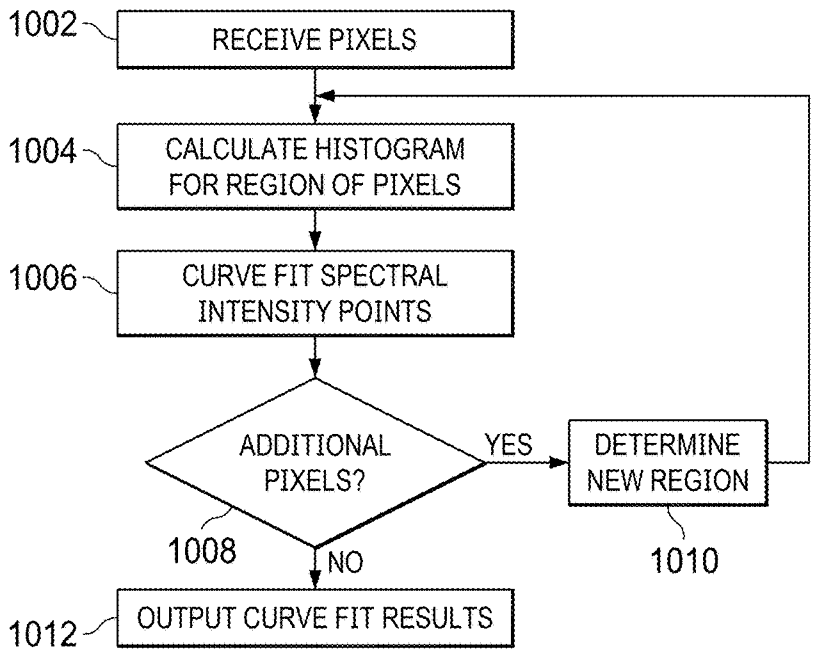
FIG. 10 illustrates a process for spectral signature processing the multi/hyperspectral data with respect to FIG. 3.

Referring now to FIG. 10, there are more particulars illustrating the process for spectral signature processing the multi/hyperspectral data. The spectral signature processing of the multi/hyperspectral images involves first receiving the associated pixel images at step 1002. Next, a histogram of a first region of the pixels is calculated at step 1004 according to the equation:

$$\text{Histogram}_{pixel}[val] = \sum_{\substack{i=\text{first pixel of region} \\ j=\text{first filter of region}}}^{\substack{\text{last pixel of region} \\ \text{last filter of region}}} (j == \text{filter})?\ val:\ 0$$

The generated histogram of intensities for the region is used to calculate goodness of fit statistics against a catalog of most likely materials for the region at step 1006. Inquiry step 1008 determines if additional pixels are available and if so, control passes to step 1010 to determine a next pixel region. If no further additional pixels are available, the spectral signature map is output at step 1012.

Within the centroid determination process, the fused thresholding data and spectral signature map data is received at step 502. The binary image values are determined at step 504 responsive to the fused thresholding data, filtered for any specific spectral signature, and the determination made if the texture map exceeds the threshold. The value for $centroid_x$ is determined at step 506 and the value for $centroid_y$ is determined at step 508. The x and y centroid values are used to determine the centroid for the spacecraft at step 510.

Figure 6:
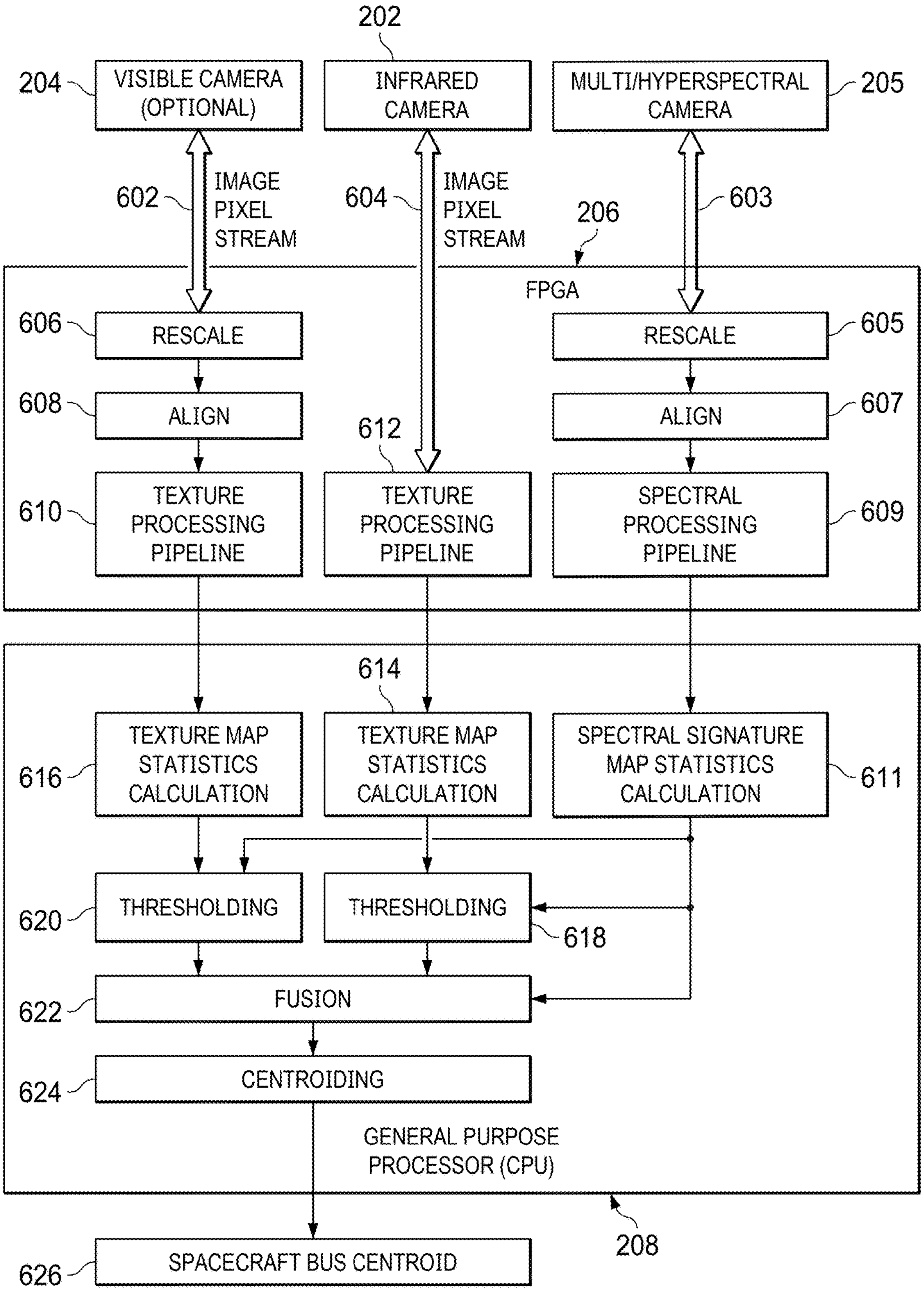
FIG. 6 illustrates a block diagram of the processes associated with determining the spacecraft bus centroid.

Referring now to FIG. 6, there is illustrated a functional block diagram of the various processes performed within the FPGA 206 and the central processing unit 208. As discussed previously, the visible camera 204 and multi/hyperspectral camera 205, which are optional, provide image pixel streams 602 of visible image data and an image pixel stream 603 of the multi/hyperspectral image data to the FPGA 206. Similarly, the infrared camera 202 provides an image pixel stream 604 of infrared pixel data to the FPGA 206. Each of the image pixel stream 602 of visible image data, image pixel stream 604 of infrared image data, and image pixel stream 603 of the multi/hyperspectral image data are provided to separate processing pipelines within the FPGA 206. The visible and multi/hyperspectral image pixel streams 602 and 603, respectively, first go through a rescaling process 606 and 605, respectively, followed by an alignment process at step 608 and 607, respectively. Finally, the rescaled and aligned visible image pixels are provided to the texture processing pipeline 610 to generate a texture map for the visible data. The rescaled and aligned multi/hyperspectral image pixels are provided to the spectral processing pipeline 609 to generate spectral samples. The infrared image pixel stream 604 needs no rescaling or alignment and is applied directly to a texture processing pipeline 612 for infrared data. The texture processing pipeline 612 generates a texture map for the infrared data.

The texture processing map for the infrared data is provided to the CPU 208 to provide for the texture map statistics calculation at 614. Similarly, the texture map for the visible data is provided to the CPU 208 for calculation of texture map statistics at 616. The texture map data has thresholding operations performed at step 618 for the infrared data and has thresholding calculations performed on the visible data at 620. The spectral sample data for the multi/hyperspectral data is provided to the CPU 208 to provide for the spectral signature map statistics calculation at 611. The thresholding information for each of the infrared data 618 and thresholding data 620 are fused at 622. The spectral signature map data 611 is used to further assist thresholding of the visible and infrared data. The fused image data is provided to a centroid process 624 in order to enable the determination of a spacecraft bus centroid 626 which is output for use in controlling the maneuvering of the spacecraft and the determination of appendages of nearby spacecraft.

Figure 7:
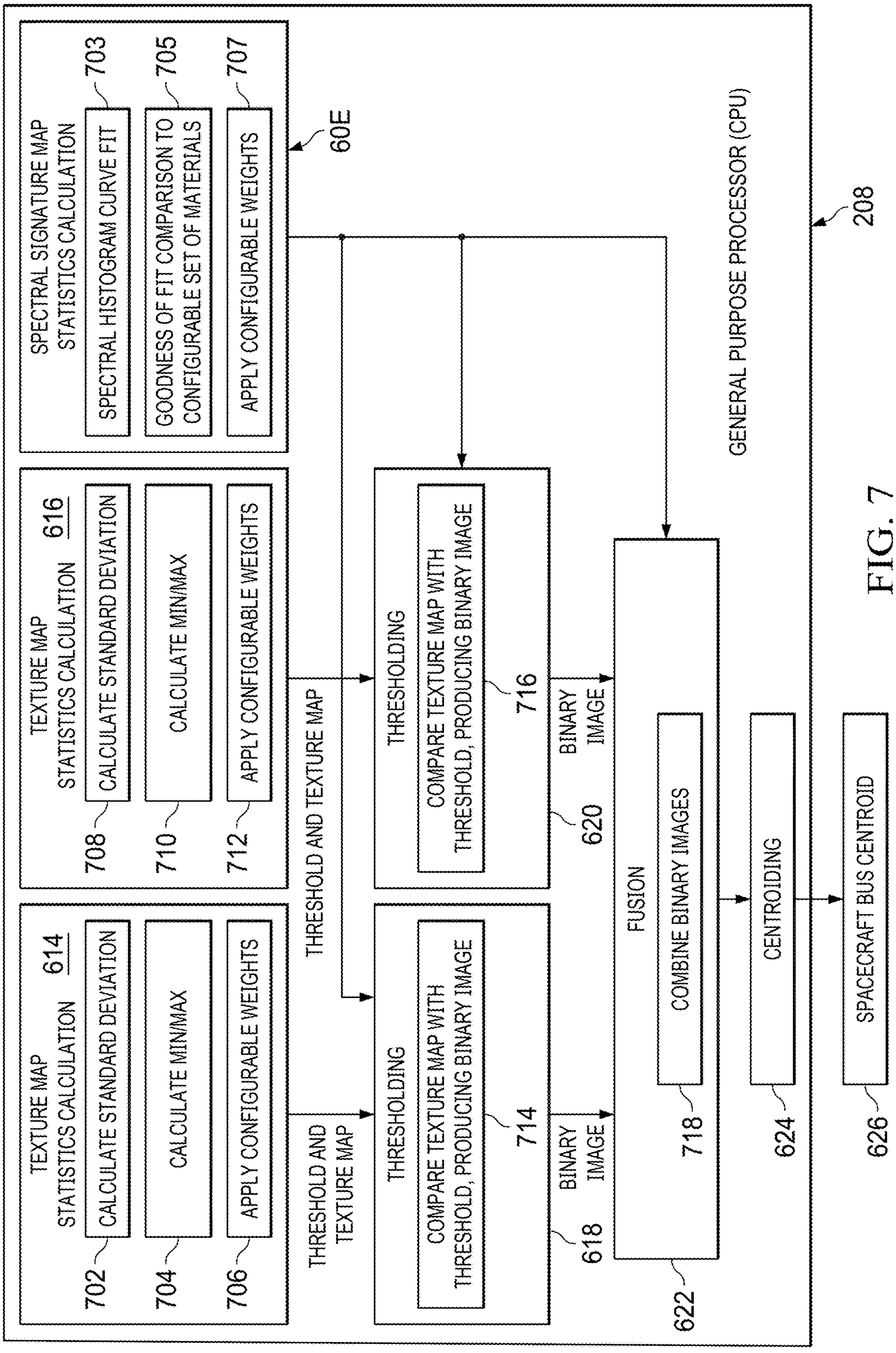
FIG. 7 illustrates a more detailed block diagram of the processes preformed within the central processing unit.

Referring now to FIG. 7, there is illustrated a more detailed block diagram of the processes preformed within the central processing unit 208. As discussed previously, the infrared image data from the infrared camera 202 is input into the texture map and statistics calculation 614. Within the texture map and statistics calculation 614, the standard deviation for the texture map is first determined at 702 responsive to the provided infrared texture map. Next, the minimum and maximum values of the texture map are calculated at 704. Configurable weights may be applied to the determined standard deviation and minimum and maximum values at 706. Similarly, within the texture map statistic calculations 616 of the visible image data, the standard deviation for the texture map is first determined at 708 responsive to the provided visible texture map. Next, the minimum and maximum values of the texture map are calculated at 710. Configurable weights may be applied to the determined standard deviation and minimum and maximum values at 712. The threshold and texture map data from the infrared data are applied to the thresholding function 618 where in the texture map is compared with the threshold to produce a binary image as described previously at 714. Similarly, the texture map and threshold from the visible data is applied to the thresholding function 620 for the visible data to compare the texture map with threshold to produce a binary image for the visible data at 716. Within the spectral map statistics calculations 611 of the multi/hyperspectral image data, a curve fit is first determined at 703 and goodness of fit comparison is calculated against a configurable set of material data at 705. Configurable weights may be applied to the determined statistics at 707. The fusion process 622 combines the binary image from the infrared data and the visible data at 718 using binary operations along with optional spectral map data as described hereinabove. The centroids are calculated at 624 using the centroid equations as described previously. The spacecraft bus centroid 626 is output to enable control operations.

Appendage centroids are generated the same way as bus centroids by using the texture maps (614 and 616) and spectral signature map (611) with different thresholding values in 618 and 620 and different logical combinations in the fusion block (622). As described previously, fusing of the thresholding information is accomplished by combining the binary masks resulting from each sensor channel (infrared/binary) with binary operations (AND, NOT, OR) which are unique to the phenomenology of each sensor channel to produce a robust output. The exact operations for the appendages are configurable as the best performance results from tuning these combination with the threshold weights. The fused thresholding results are used by the processor 208 to calculate the bus centroid of the appendage. The generated centroid is output and used by control systems to assist the docking spacecraft 102 to dock with a second spacecraft 104 while determining and avoiding various appendages 108.

The resulting appendage binary maps are centroided via the same centroiding process as described above. The centroid is determined using the equations:

$$centroid_x = \frac{\sum_{i=1}^{n} (binaryImage_x[i] * binaryImage[i])}{\sum_{i=1}^{n} binaryImage[i]}$$

$$centroid_y = \frac{\sum_{i=1}^{n} (binaryImage_y[i] * binaryImage[i])}{\sum_{i=1}^{n} binaryImage[i]}$$

where the binaryImage is a matrix made of either "0" or "1" indicating if the texture map exceeded the threshold. $BinaryImage_x$ is a matrix of the same size as binaryImage but containing the x coordinate of each pixel. $BinaryImage_y$ is a matrix of the same size as binaryImage but containing the y coordinate of each pixel and $binaryImage_y$.

This produces a centroid for each visible appendage. The texture map pipelines are unaffected and unchanged, with the only differences for the appendage centroiding being in the thresholding and fusion blocks. The centroids of the appendages may then similarly be used for avoiding the appendages during docking control processes.

Figure 8:
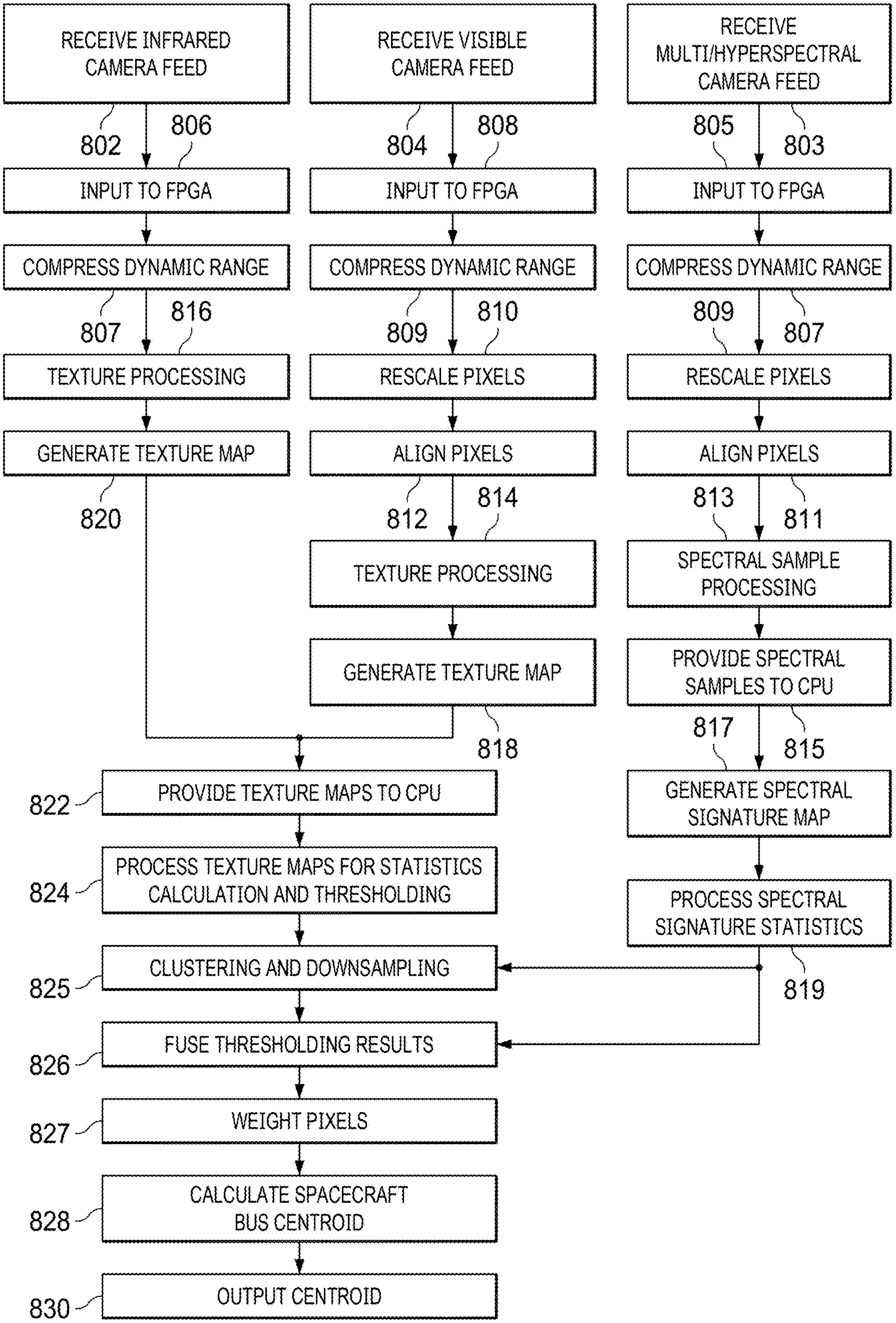
FIG. 8 illustrates an alternative embodiment of a flow diagram for determining a centroid of an object.

Referring now to FIG. 8, there is illustrated a flow diagram of an alternative embodiment of a process for generating the spacecraft bus centroid responsive to image data provided from the infrared camera 102 and visible camera 104. Initially, pixel image data is received from both the infrared camera feed, visible camera feed, and multi/hyperspectral camera feed at 802, 804, 803, respectively. The received image feeds are input at 806, 808, and 805 from the infrared camera 202 to the FPGA 206 (806), from the visible camera 204 to the FPGA 206 (808), and from the multi/hyperspectral camera 205 to the FPGA 206 (805). The infrared, visible, and multi/hyperspectral images are fed into the FPGA 206 using a pixel transfer standard (e.g., CameraLink, Ethernet, etc.). As the pixels enter the FPGA 206, they enter three different pipelines for each type of camera.

The pixels input to the FPGA 206 from the infrared camera 202, visible camera 204, and multi/hyperspectral camera 205 over the three different pipelines. For at least one of the pixel streams, the dynamic range of the pixel stream is compressed at step 807/809/807. The purpose of dynamic range compression is to map the natural dynamic range of the image pixels to a smaller range. This is achieved by modifying the illumination component of the image. Dynamic range compression is used to compress the dynamic range of an image represented by the image pixels, reducing highlights, and lifting shadows.

The received pixel image data from the visible camera 204 and multi/hyperspectral camera 205 are rescaled at step 810 and 809, respectively. The rescaling process is a method to resize the image data and may involve scaling the image data either up or down. The resizing algorithm will process the received image data and generate a new image having a different resolution. The rescaled pixel data from step 810/809 is aligned with the pixels from the infrared image data at step 812 and 811, respectively. The need for pixel rescaling and alignment arises from the fact that the visible and multi/hyperspectral camera image data will have many more pixels than the infrared camera image data for a similar area being monitored. The rescaled pixels are aligned at step 812 and 811, respectively. The rescaling 810/809 and alignment 812/811 processes use linear interpolation in a fast pipelined process within the FPGA 206 to generate a resampled image within the time between pixels being sent from the camera 104. This enables the use of cameras with little or no vertical or horizontal blanking.

The aligned pixels from the visible image data and the infrared pixels from the infrared image data are texture processed at steps 814 and 816, respectively, to generate texture maps. The data from the infrared camera 202 and the visible camera 204 are provided to separate texture processing pipelines within the FPGA 206. The texture processing pipelines perform identical but separate operations to each set of image data. The texture processing pipelines are identical between both the infrared and visible data paths. The texture processing operation will be more fully discussed hereinbelow with respect to FIG. 9. The texture processing pipelines process the texture statistics in a pipeline as the image pixels (infrared/visible) stream into the FPGA 206. The texture image is complete and available for use by the CPU 208 as soon as the last pixel of an image has finished being sent to the FPGA 206. The texture processing data generated at steps 814 and 816 is used to generate texture maps for the visible data at step 318 and to generate a texture map for the infrared data at step 820. Thus, the FPGA 206 will have created two separate texture maps one for the infrared data and one for the visible data. An image texture comprises a set of metrics calculated in image processing designed to quantify the perceived texture of an image. Image texture gives information about the spatial arrangement of color or intensities in an image or selected region of an image.

The aligned pixels from the multi/hyperspectral image data are spectrally processed at step 813 to generate spectral signature data. The spectral processing operation will be more fully discussed hereinbelow with respect to FIG. 11. The spectral processing pipeline processes the spectral statistics in a pipeline as the image pixels stream into the FPGA 206. The multi/hyperspectral image is complete and available for use by the CPU 208 as soon as the last pixel of an image has finished being sent to the FPGA 206.

The texture map generated from the visible image data at step 818 as well as the texture map generated using the infrared image data at step 820 are both provided to a central processing unit at step 822. The visible data texture map and infrared data texture map are processed by the CPU 208 to perform statistics calculations and thresholding for each set of texture maps. Within step 824, the dynamic range compressed pixels from step 807 are fed through a corner and edge detector to determine which subregions of the image most likely contain the space object. The resulting subregions are used to define the area where the entropy threshold for the entire image is calculated. The algorithm for the statistics calculations and thresholding uses tuned and additional configurable weightings along with calculated standard deviations, minimums and maximums of the texture maps in order to produce a threshold utilized by later processing to produce a binary map for each sensor channel of the infrared and visible image data.

The spectral sample data generated from the multi/hyperspectral data at step 813 is provided to the central processing unit at step 815. The spectral sample data is processed by the CPU 208 to generate a spectral signature map at step 817 and to generate at step 819 spectral signature statistics. The algorithm for the statistics calculations and thresholding uses tuned and configurable weightings along with calculated standard deviations, minimums and maximums of the spectral intensity data in order to produce likely candidate material and confidence information utilized by later processing at steps 824, 825 and 826.

The entropy values from the subregions in step 824 are downsampled, clustered, and then de-weighted to emphasize pixels in the center of the subregions and to generate final threshold values of the at least one pixel stream at 825. The downsampling, clustering, and de-weighting process uses the material and confidence information from the spectral signature map at step 819 to weight pixels in the subregions of visible and infrared data. The downsampling and clustering use a k-means algorithm, however, it should be realized that other types of clustering techniques may be used.

The thresholding information for both the visible data and infrared data are fused at step 826. The thresholding and fusing process uses the material and confidence information from the spectral signature map from step 819 to further assist thresholding of the visible and infrared data. The fusing process is made easier by the rescaling and alignment performed earlier within the process at 810, 812, 809, 811. Fusing of the thresholding information is accomplished by combining the binary masks resulting from each sensor channel (infrared/binary) with binary operations (AND, NOT, OR) which are unique to the phenomenology of each sensor channel to produce a robust output. The exact operations are configurable as the best performance results from tuning these combination with the threshold weights used in the previous step. The fused thresholding results are then combined in and weighted at 827. Combining of the fused thresholding results is performed by using a convex hull algorithm on all the thresholding results, however, it should be realized that other types of combining algorithms may be used. The weighting is done by a weighted mean of the combined fused thresholding results where results located at pixels closer to the center of the convex hull are weighted more heavily than those at the edges. The fused, combined, and weighted thresholding results from step 827 are used by the processor 208 to calculate the bus centroid of the spacecraft at step 828. The generated centroid is output at step 830 and used by control systems to assist the docking spacecraft 102 to dock with a second spacecraft 104 while determining and avoiding various appendages 108.

Since the FPGA 206 completes the initial processing of the data in the real time, the CPU 208 has up to an additional frame time to complete processing and output the spacecraft bus centroid. The entire process leads to a centroid being processed at the same frame rate as the cameras and delayed only up to one frame of the camera. The processing provided by the CPU 208 can be tuned in order to improve system performance under a variety of conditions.

Figure 9:
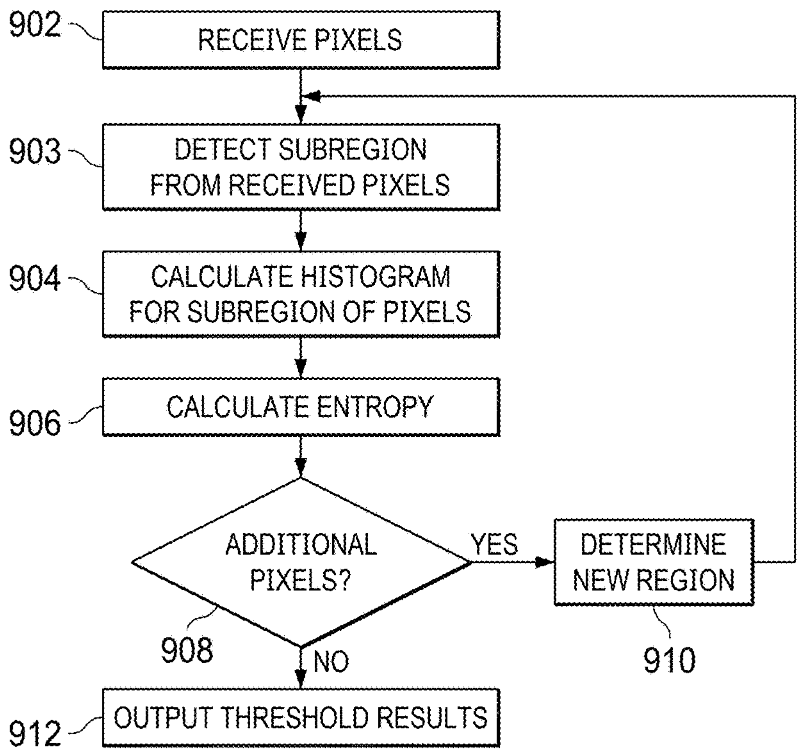
FIG. 9 illustrates an alternative embodiment of a flow diagram of the process for texture processing.

Referring now to FIG. 9 there are more particulars illustrating the process for texture processing the infrared data and the visible data. The infrared data and visible data are texture processed separately and combined later when fusing the thresholding results. The texture processing of each of the infrared images and the visible images involves first receiving the associated pixel images at step 902. A subregion within the received pixels is detected at step 903 that will be used for histogram processing. Detection of the subregion is achieved using an edge detector, followed by thresholding. This enables finding of the subregion from a binary image. Next, a histogram of the detected subregion of the pixels is calculated at step 404 according to the equation:

$$\text{Histogram}_{pixel}[val] = \sum_{i=\text{first pixel of region}}^{\text{last pixel of region}} (i == val)$$

The generated histogram is used to calculate entropy at step 906 wherein the number of pixels in the analyzed region is used according to the equation:

$$\text{Output[pixel]} = \sum_{i=1}^{n} \frac{\text{Histogram}[i]_{pixel}}{n} * (\log_2 \text{Histogram}[i] - \log_2 n)$$

Inquiry step 908 determines if additional pixels are available and if so, control passes to step 903 to determine a next subregion. If no further additional pixels are available, the texture processed image map is output at step 912.

Figure 11:
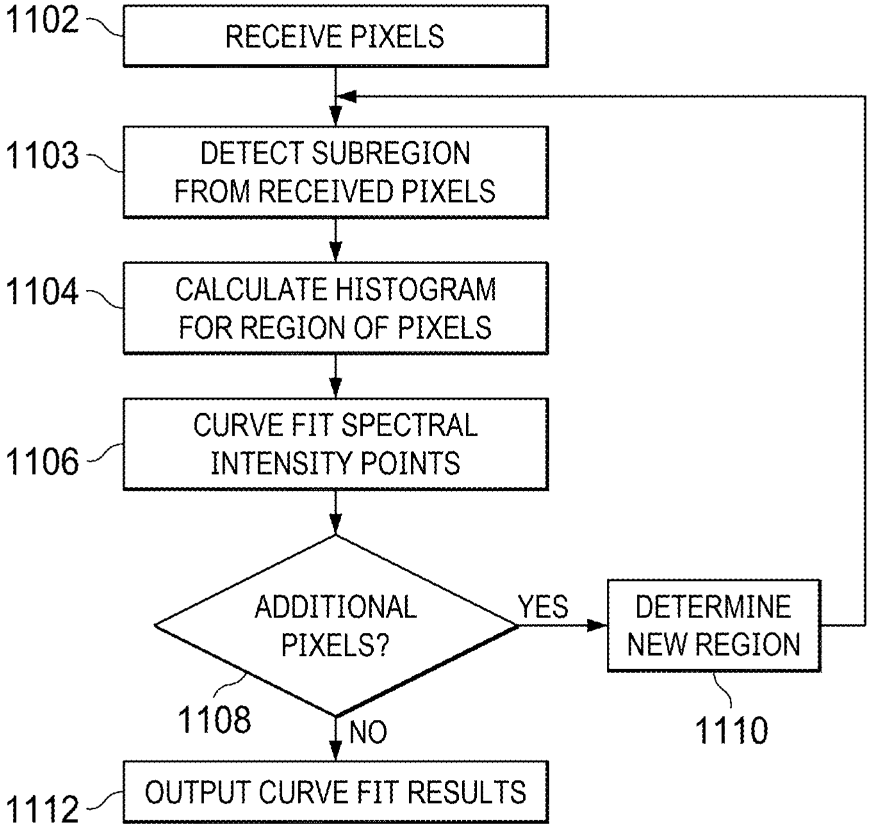
FIG. 11 illustrates a process for spectral signature processing multi/hyperspectral image data with respect to FIG. 9.

Referring now to FIG. 11, there are more particulars illustrating the process for spectral signature processing the multi/hyperspectral image data. The spectral signature processing of the multi/hyperspectral images involves first receiving the associated pixel images at step 1102. A subregion within the received pixels is detected at step 1103 that will be used for spectral signature processing. Detection of the subregion is achieved using an edge detector, followed by thresholding. This enables finding of the subregion from a binary image. Next, a histogram of the detected subregion of the pixels is calculated at step 1104 according to the equation:

$$\text{Histogram}_{pixel}[val] = \sum_{\substack{i=\text{first pixel of region}\\ j=\text{first filter of region}}}^{\substack{\text{last pixel of region}\\ \text{last filter of region}}} (j == \text{filter})?\ val:\ 0$$

The generated histogram of intensities for each region of the subregion is used to calculate goodness of fit statistics against a catalog of most likely materials for the region at step 1106. Inquiry step 1108 determines if additional pixels are available and if so, control passes to step 1110 to determine a next pixel region. If no further additional pixels are available, the spectral signature map is output at step 1112.

The specific FPGA 206 implementation optimizes the computation by using comparators in the FPGA for formation of the histogram. Additionally, for a fixed region, the logarithmic calculations are simplified to lookup tables due to the fact that the pixel values are a set of known discrete integers (0, 1, 2, 3 . . . ). Finally, some of the intermediate calculations are done using fixed point integer math. The pipeline is formed by recognizing that the output of the region is an incremental update formed by adding and removing only pixels that slide into or out of the region at step 408.

It will be appreciated by those skilled in the art having the benefit of this disclosure that this system and method for identifying and distinguishing spacecraft appendages from the spacecraft body provides the ability of detecting and distinguishing appendages on a spacecraft with which another spacecraft is attempting to dock. It should be understood that the drawings and detailed description herein are to be regarded in an illustrative rather than a restrictive manner and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method for controlling docking with a spacecraft, comprising:

receiving at least one first image pixel stream from at least one camera;

receiving a second pixel stream of images at multiple wavelengths from a spectral camera;

texture processing the at least one first image pixel stream to generate at least one texture map for the at least one image pixel stream;

spectral image processing the second pixel stream to generate at least one spectral map;

generating thresholding results for each of the at least one first image pixel stream responsive to the generated at least one texture map and the at least one spectral map;

fusing each of the thresholding results for the at least one first image pixel stream to create fused thresholding results;

determining a bus centroid of the spacecraft responsive to the fused thresholding results; and controlling docking of with the spacecraft responsive to the determined bus centroid.

2. The method of claim 1, wherein the step of receiving further comprises:

receiving a third pixel stream from a visible image camera; and receiving a fourth pixel stream from an infrared image camera.

3. The method of claim 1 further comprising:

rescaling an image from the second pixel stream from a first resolution to a second resolution; and aligning rescaled pixels of the second pixel stream with pixels of the at least one first image pixel stream.

4. The method of claim 1, wherein the step of spectral image processing further comprises:

generating spectral signature data from the second pixel stream;

generating a spectral map from the spectral signature data; and generating spectral statistics from the spectral signature data.

5. The method of claim 1 further including determining appendages of the spacecraft associated with the at least one first image pixel stream and the second pixel stream using the determined bus centroid of the spacecraft.

6. The method of claim 1, wherein the step of spectral image processing further comprises:

(a) determining a histogram for a first region of pixels in the second pixel stream of the spectral camera;

(b) calculating a curve fit of spectral intensity points for the histogram for the first region of pixels;

(c) determining a next histogram for a next region of pixels in the second pixel stream of the spectral camera;

(d) calculating the curve fit of the spectral intensity points for the next histogram for the next region of pixels; and (e) repeating steps (c) and (d) until all regions of the pixels in the second pixel stream have been processed.

7. The method of claim 1, wherein the step of controlling docking further comprises the step of autonomously docking with the spacecraft.

8. An apparatus for controlling docking with a spacecraft, comprising:

at least one camera for generating at least one first image pixel stream of the spacecraft;

a spectral camera for receiving a second pixel stream of images at multiple wavelengths;

a field programmable gate array (FPGA) for receiving the at least one first image pixel stream from the at least one camera and the second pixel stream of images at multiple wavelength, the FPGA texture processing the at least one first image pixel stream to generate at least one texture map for the at least one image pixel stream and spectral image processing the second pixel stream to generate at least one spectral map;

a processor for receiving the at least one texture map and the at least one spectral map from the FPGA, the processor further configured to:

generate thresholding results for each of the at least one first image pixel stream responsive to the generated at least one texture map and the at least one spectral map;

fuse each of the thresholding results for the at least one first image pixel stream and the second pixel stream to create fused thresholding results;

determine a bus centroid of the spacecraft responsive to the fused thresholding results;

output the determined bus centroid of the spacecraft; and a docking controller for controlling docking with the spacecraft responsive to the determined bus centroid of the spacecraft.

9. The apparatus of claim 8, wherein the at least one camera further comprises:

a visible camera for generating a visible pixel image stream of the spacecraft; and an infrared camera for generating an infrared pixel image stream of the spacecraft.

10. The apparatus of claim 8, wherein the FPGA further:

rescales an image from the second pixel stream from a first resolution to a second resolution; and aligning rescaled pixels of the second pixel stream with pixels of the at least one first image pixel stream.

11. The apparatus of claim 8, wherein the FPGA further:

generates spectral signature data from the second pixel stream;

generates a spectral map from the spectral signature data; and generates spectral statistics from the spectral signature data.

12. The apparatus of claim 8, wherein the processor determines appendages of the spacecraft associated with the at least one first image pixel stream and the second pixel stream using the determined bus centroid of the spacecraft.

13. The apparatus of claim 8, wherein the FPGA further:

(a) determines a histogram for a first region of pixels in the second pixel stream of the spectral camera;

(b) calculates a curve fit of spectral intensity points for the histogram for the first region of pixels;

(c) determines a next histogram for a next region of pixels in the second pixel stream of the spectral camera;

(d) calculates the curve fit of the spectral intensity points for the next histogram for the next region of pixels; and (e) repeats steps (c) and (d) until all regions of the pixels in the second pixel stream have been processed.

14. The apparatus of claim 8, wherein the docking controller controls autonomous docking with the spacecraft.

15. A method for controlling docking with a spacecraft, comprising:

receiving a first pixel stream from a visible image camera;

receiving a second pixel stream from an infrared image camera;

receiving a third pixel stream of images at multiple wavelengths from a multi/hyperspectral camera;

detecting a sub-region from the first, the second, and the third image pixel streams having a compressed dynamic range;

rescaling an image from the first pixel stream and the third pixel stream from a first resolution to a second resolution;

aligning rescaled pixels of the first pixel stream and the third pixel stream with infrared pixels of the second pixel stream;

texture processing the rescaled and aligned first pixel stream to generate a first texture map for the first pixel stream;

texture processing the second pixel stream to generate a second texture map for the second pixel stream;

spectral image processing the rescaled and aligned third pixel stream to generate a spectral map for the third pixel stream;

generating first thresholding results for the first pixel stream responsive to the generated first texture map and the generated spectral map;

generating second thresholding results for the second pixel stream responsive to the generated second texture map and the generated spectral map;

clustering and downsampling the generated first and second thresholding results;

fusing the first thresholding results for the first pixel stream and the second thresholding results for the second pixel stream to create fused thresholding results;

determining a bus centroid of the spacecraft responsive to the fused thresholding results; and controlling docking of with the spacecraft responsive to the determined bus centroid.

16. The method of claim 15 further including determining appendages of the spacecraft associated with the first, the second and the third pixel streams using the determined bus centroid of the spacecraft.

17. The method of claim 15, wherein the step of texture processing further comprises:

(a) determining a histogram for a first region of pixels in the third pixel stream of the multi/hyperspectral camera;

(b) calculating a curve fit of spectral intensity points for the histogram for the first region of pixels;

(c) determining a next histogram for a next region of pixels in the second pixel stream of the infrared image camera;

(d) calculating the curve fit of the spectral intensity points for the next histogram for the next region of pixels; and (e) repeating steps (c) and (d) until all regions of the pixels in the second pixel stream have been processed.

18. The method of claim 15, wherein the step of spectral image processing further comprises:

generating spectral signature data from the third pixel stream;

generating the spectral map from the spectral signature data; and generating spectral statistics from the spectral signature data.

19. The method of claim 15 further including determining appendages of the spacecraft associated with the first pixel stream and the second pixel stream using the determined bus centroid of the spacecraft.

20. The method of claim 18, wherein the step of controlling docking further comprises the step of autonomously docking with the spacecraft.

* * * * *